US010723412B2

(12) United States Patent
Chen et al.

(10) Patent No.: US 10,723,412 B2
(45) Date of Patent: Jul. 28, 2020

(54) STRUCTURE OF ELECTRIC VEHICLE (71) Applicant: KWANG YANG MOTOR CO., LTD., Kaohsiung (TW)

(72) Inventors: Yi-Tso Chen, Kaohsiung (TW); Shiow-Pyng Ke, Kaohsiung (TW); Tai-Yuan Su, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 0 days.

(21) Appl. No.: 16/247,576

(22) Filed: Jan. 15, 2019

(65) Prior Publication Data
US 2019/0233052 A1 Aug. 1, 2019

(30) Foreign Application Priority Data

Jan. 31, 2018 (TW) .............................. 107103530 A (51) Int. Cl.
B60K 1/04 (2019.01)
B62M 7/04 (2006.01)
B62M 7/12 (2006.01)
B62K 11/10 (2006.01)
B62H 1/02 (2006.01)
B62J 17/00 (2020.01)
B60L 50/64 (2019.01)
B60L 50/60 (2019.01)
B62K 11/04 (2006.01)
B62J 43/00 (2020.01)

(52) U.S. Cl.
CPC ................ B62M 7/04 (2013.01); B60K 1/04 (2013.01); B60L 50/64 (2019.02); B60L 50/66 (2019.02); B62H 1/02 (2013.01); B62J 17/00 (2013.01); B62K 11/04 (2013.01); B62K 11/10 (2013.01); B62M 7/12 (2013.01); B60Y 2200/126 (2013.01); B62J 43/00 (2020.02); B62K 2202/00 (2013.01); B62K 2204/00 (2013.01)

(58) Field of Classification Search
CPC ....................................................... B60K 11/00
See application file for complete search history.

(56) References Cited

U.S. PATENT DOCUMENTS

2012/0197470 A1* 8/2012 Inui .......................... B62H 1/02
701/22
2015/0329168 A1* 11/2015 Kawabata ................ B62J 11/00
318/139

* cited by examiner

Primary Examiner — John D Walters
Assistant Examiner — James J Triggs
(74) Attorney, Agent, or Firm — Leong C. Lei (57) ABSTRACT An electric vehicle includes a frame unit and a vehicle body cover unit. The frame unit includes tread tubes extending toward a rear side and arranged pairwise as a left tread tube and a right tread tube. The vehicle body cover unit includes a tread board that shields the left tread tube and the right tread tube. The frame unit is provided with a battery box that receives and holds therein a battery and the frame unit is provided thereon with a side stand. The electric vehicle is provided with an electric connection mechanism on the vehicle body at one side thereof opposite to the side stand for replenishing the battery with external electric power so that a drawback that the electric vehicle tips over when replenishment of electric power is being made to the battery is prevented to thereby improve utilization of the electric vehicle.

13 Claims, 6 Drawing Sheets

STRUCTURE OF ELECTRIC VEHICLE

TECHNICAL FIELD OF THE INVENTION

The present invention generally relates to a structure of an electric vehicle, and more particularly to a structure of an electric vehicle that prevents the electric vehicle from tipping over while a battery is supplemented with electrical power, to thereby improve utilization of the electric vehicle.

DESCRIPTION OF THE PRIOR ART

In light of various factors of environmental friendliness and energy conservation, electric vehicles are getting prevailing. Electric vehicles are now a focus of development for all vehicle manufacturers.

Figure 1:
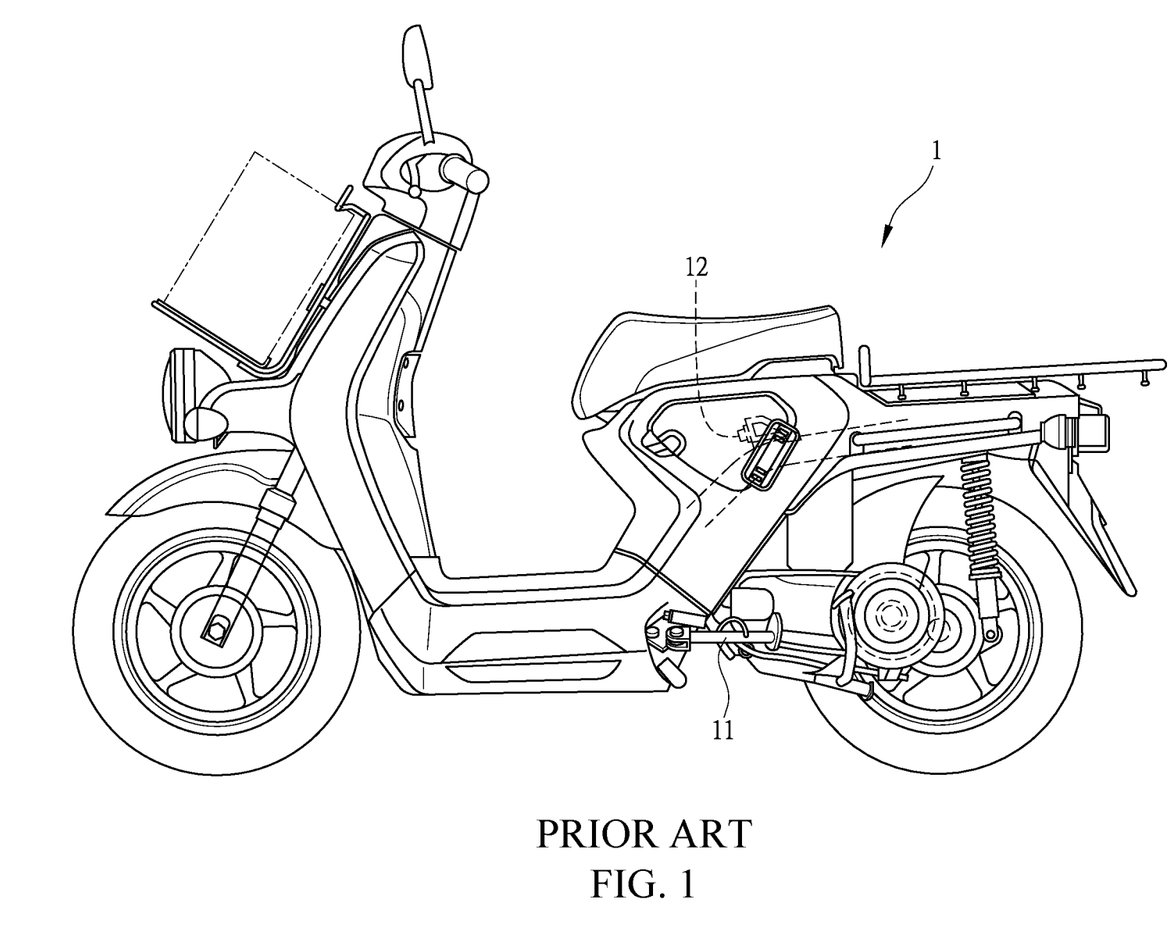
FIG. 1 is a schematic view illustrating Taiwan Patent TWI406785.

As shown in FIG. 1, one of the manufacturers proposed an invention in Taiwan Patent TWI406785, which includes a charging seat 12 provided on one vehicle body side of an electric vehicle 1 on which a side stand 11 is mounted for charging of a battery of the electric vehicle 1. Charging of the battery of the electric vehicle 1 is made easy with the charging seat 12 so arranged.

Although the Taiwan patent TWI406785 provides convenience for readily charging the electric vehicle 1 through the arrangement of the charging seat 12, the charging seat 12 is provided on the vehicle body at the same side as arrangement of side stand 11 of the electric vehicle 1, so that when a vehicle operator (particularly a female operator) who frequently uses the side stand 11 for parking, when completing parking, is desired make charging to the vehicle, considering the situation that when parking is made with the side stand 11, the electric vehicle 1 is parked in a condition of being tilting in a direction toward the side stand 11, meaning the side stand 11 functions as a primary support for parking, since an external charging plug has to be inserted through push in a direction from the side where the side stand 11 is arranged toward an opposite side, when the vehicle operator attempts to push the charging plug in a direction toward the vehicle body side where the side stand 11 of the electric vehicle 1 is arranged for insertion, due to no support being provided on the side of the electric vehicle 1 that is opposite to the side stand 11, the user's forcibly pushing the external charging pug might potentially cause the electric vehicle 1 to tip over in a direction toward the side where no side stand 11 is arranged so that the electric vehicle 1 might be damaged or even worse, people might get hurt.

Thus, it is a challenge for electric vehicle manufacturers to provide a structure of an electric vehicle that eases charging of the electric vehicle and helps improve security in charging the electric vehicle.

SUMMARY OF THE INVENTION

The primary objective of the present invention is to provide a structure of an electric vehicle, which overcomes the drawback that a known electric vehicle suffers a potential risk of easily tipping over in replenishing electric power to a battery.

For such a purpose, the primary technical solution of the present invention as proposed in claim 1 is to provide a structure of an electric vehicle, wherein the electric vehicle at least comprises a frame unit and a vehicle body cover unit; the frame unit comprises tread tubes extending toward a rear side of a vehicle body, the tread tubes being arranged pairwise at left and right sides respectively as a left tread tube and a right tread tube; the vehicle body cover unit at least comprises a tread board that shields the left tread tube and the right tread tube; the frame unit is provided with a battery box that receives and holds therein a battery, and the frame unit is provided thereon with a side stand, wherein the electric vehicle is provided with an electric connection mechanism on the vehicle body at one side thereof opposite to the side stand for replenishing the battery with external electric power.

For such a purpose, the primary technical solution of the present invention as proposed in claim 2 is to provide a structure of an electric vehicle, wherein the battery box is shaft-supported on the frame unit and is provided, on one side thereof, with an opening device, the opening device comprising a power unit and a driven element drivable by the power unit; the power unit is mounted on the tread tubes and the driven element is arranged on one side of an external circumference of the battery box.

For such a purpose, the primary technical solution of the present invention as proposed in claim 3 is to provide a structure of an electric vehicle, wherein the frame unit is provided thereon with a seat section; the vehicle body cover unit further comprises a central vehicle body cover, the central vehicle body cover being located under the seat section, the tread board forming a foot support section; the electric connection mechanism is arranged on the central vehicle body cover at a location under and slightly rearward of a front end of the seat section and is located above the foot support section.

For such a purpose, the primary technical solution of the present invention as proposed in claim 4 is to provide a structure of an electric vehicle, wherein, when viewed from a top side, the electric connection mechanism and the side stand are respectively located at two sides of a vehicle body center axis line of the electric vehicle.

For such a purpose, the primary technical solution of the present invention as proposed in claim 5 is to provide a structure of an electric vehicle, wherein the electric connection mechanism comprises an electric connection seat and a shielding member set outside and covering the electric connection seat.

For such a purpose, the primary technical solution of the present invention as proposed in claim 6 is to provide a structure of an electric vehicle, wherein the electric connection seat comprises an opening section and a receptacle arranged in the opening section; the shielding member is rotatably mounted to the frame unit or the central vehicle body cover by a pivotal joint section.

For such a purpose, the primary technical solution of the present invention as proposed in claim 7 is to provide a structure of an electric vehicle, wherein the shielding member is formed with a part of the central vehicle body cover.

For such a purpose, the primary technical solution of the present invention as proposed in claim 8 is to provide a structure of an electric vehicle, wherein the opening section of the electric connection seat is formed to face away from the vehicle body center axis line of the electric vehicle and generally horizontal with respect to a ground surface.

For such a purpose, the primary technical solution of the present invention as proposed in claim 9 is to provide a structure of an electric vehicle, wherein the electric vehicle further comprises a second battery, the frame unit being provided thereon with a seat section; the electric connection mechanism is arranged under the seat section and is located between the battery and the second battery.

The efficacy that the primary technical solution of the present invention proposed in claim 1 is that the drawback that the electric vehicle tips over during replenishment of electric power being made to the battery is prevented to thereby improve utilization of the electric vehicle.

The efficacy that the primary technical solution of the present invention proposed in claim 2 is that installation of the opening device is made easy.

The efficacy that the primary technical solution of the present invention proposed in claim 3 is that performance of maintenance and repairing engineering of the electric connection mechanism is made easy.

The efficacy that the primary technical solution of the present invention proposed in claim 4 is that the drawback that the electric vehicle tips over during replenishment of electric power being made to the battery is prevented to thereby improve utilization of the electric vehicle.

The efficacy that the primary technical solution of the present invention proposed in claim 5 is that the structure of the electric connection mechanism is simplified and the electric connection mechanism is provided with a property of cancellation.

The efficacy that the primary technical solution of the present invention proposed in claim 6 is that the structures of the electric connection seat and the shielding member of the electric connection mechanism are simplified.

The efficacy that the primary technical solution of the present invention proposed in claim 7 is that the structure of the shielding member of the electric connection mechanism is simplified.

The efficacy that the primary technical solution of the present invention proposed in claim 8 is that parking stability of the electric vehicle is improved during an operation of charging with external power supply.

The efficacy that the primary technical solution of the present invention proposed in claim 9 is that a length of an electric wire between the electric connection mechanism and the battery and the second battery is effectively reduced and a cost of electrical connection between the electric connection mechanism and the battery and the second battery is reduced.

DETAILED DESCRIPTION OF THE PREFERRED EMBODIMENTS

Figure 2:
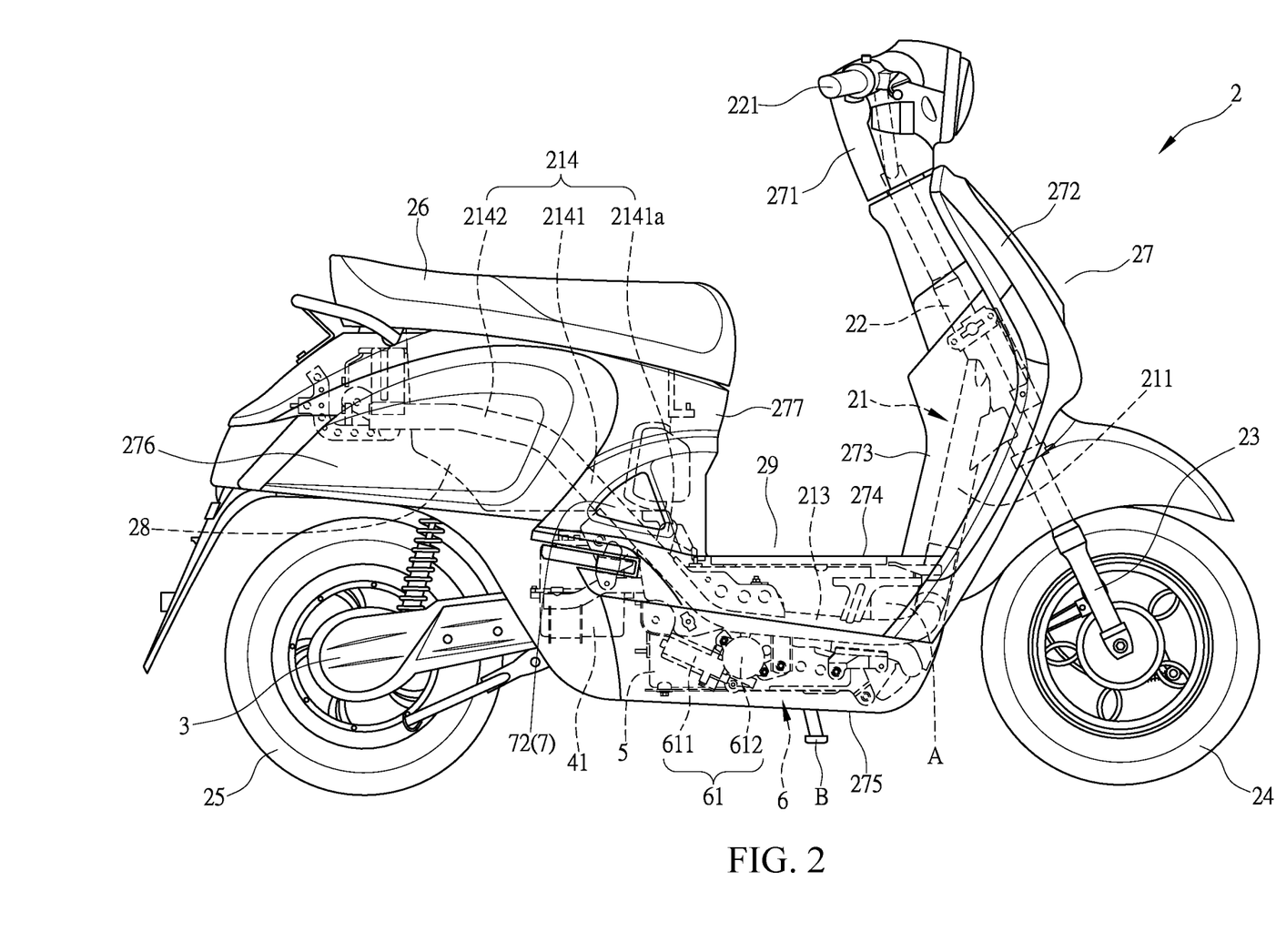
FIG. 2 is a side elevational view illustrating an electric vehicle according to the present invention.
Figure 3:
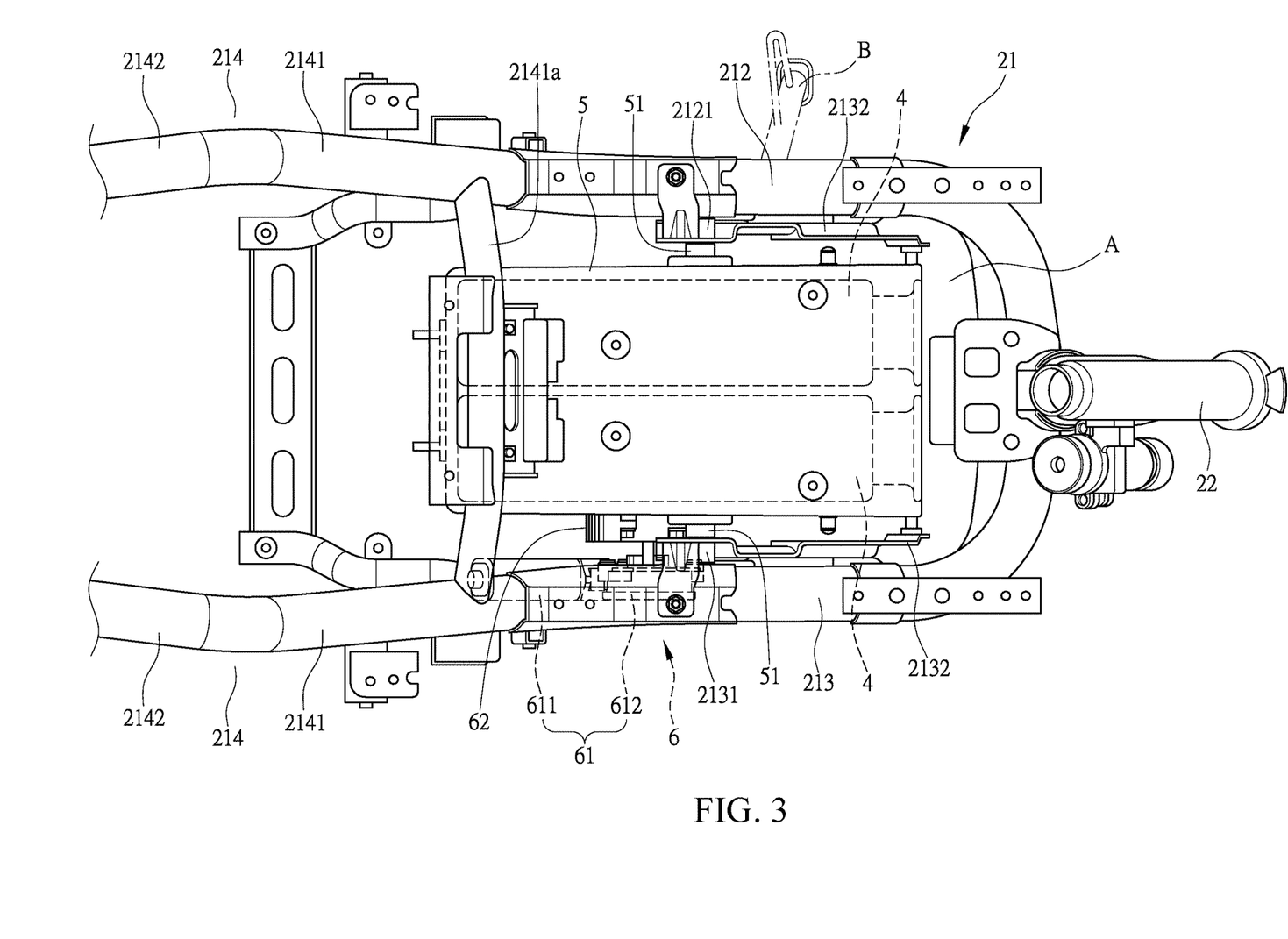
FIG. 3 is a top plan view illustrating an arrangement of a battery box of the electric vehicle according to the present invention.
Figure 4:
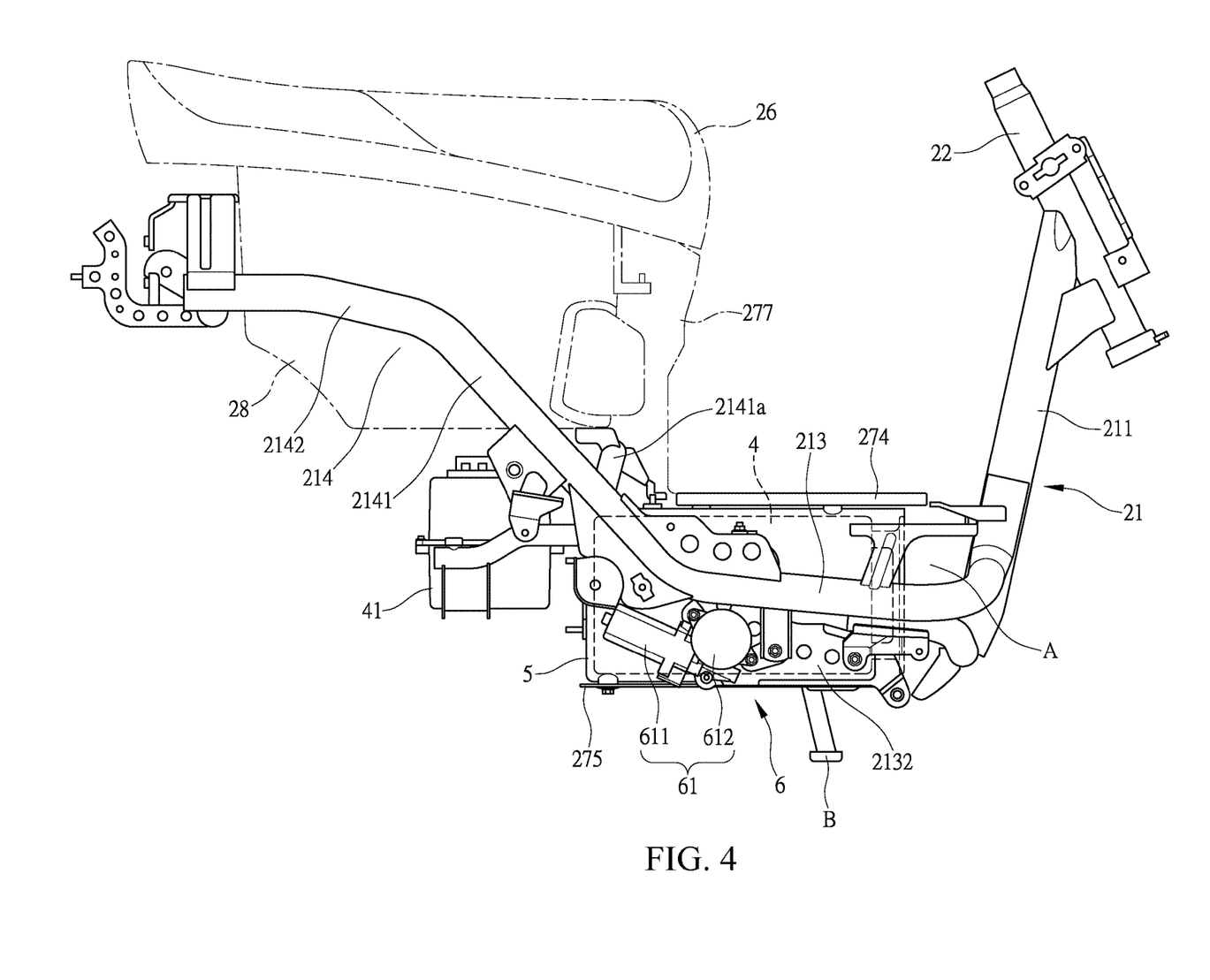
FIG. 4 is a schematic view illustrating the arrangement of the battery box of the electric vehicle according to the present invention.

Firstly, referring to FIGS. 2, 3, and 4, the present invention provides a structure of an electric vehicle. The electric vehicle 2 has a frame unit 21 that is provided, at a front side thereof, with a head tube 22. The head tube 22 is provided, at an upper side thereof, with a steering mechanism 221. The steering mechanism 221 is connected, at a lower side thereof, to a front fork unit (a front shock absorber) 23. The front fork unit 23 is provided, at a lower side thereof and in a rotatable manner, with a front wheel 24. The frame unit 21 comprises a main tube 211 extending from the head tube 22 in a direction toward a rear side of a vehicle body. The main tube 211 is provided, as being further extended toward the rear side of the vehicle body, with tread tubes, and the tread tubes are arranged pairwise at left and right sides as a left tread tube 212 and a right tread tube 213. The left tread tube 212 and the right tread tube 213 are provided with rear frames 214 that are arranged pairwise at the left and right sides, respectively, and extend toward the rear side of the vehicle body. The rear frames 214 comprise rise sections 2141 and side frame sections 2142. A transverse tube 2141a is arranged between the rise sections 2141. A rear wheel 25 is arranged rearward of and under the rear frames 214. A driving motor 3 is arranged at one side of the rear wheel 25. The driving motor 3 is operable to drive the rear wheel 25 in order to cause the electric vehicle 2 to move forward. A seat section 26 is arranged rearward of the steering mechanism 221 and located above the rear wheel 25 and a spacing distance is provided between the seat section 26 and the steering mechanism 221. The electric vehicle 2 is provided, on an outside thereof, with a vehicle body cover unit 27. The vehicle body cover unit 27 comprises a head cover 271 housing the steering mechanism 221, a front cover 272 arranged under the head cover 271 and housing a front end of the vehicle body, and a knee-shielding cover 273 arranged rearward of the front cover 272. A tread board 274 is arranged between the steering mechanism 221 and the seat section 26 at a lower side thereof. A bottom cover 275 is arranged under the tread board 274. The electric vehicle 2 is provided, on two sides thereof, with side vehicle body covers 276 under the seat section 26. A central vehicle body cover 277 is provided under a front end portion of the seat section 26. An article storage box 28 is arranged under the seat section 26 and an upper side of the article storage box 28 is shielded by the seat section 26. The electric vehicle 2 comprises a side stand B provided on one side of the frame unit 21 for parking purposes. The side stand B is arranged at one side of the left tread tube 212 or the right tread tube 213. In this invention, the side stand B is arranged on the left tread tube 212. The electric vehicle 2 is provided with a power source, of which an example that is shown in the drawings includes a driving motor 3 that drives the rear wheel 25. In practice, the electric vehicle 2 of the present invention can alternatively provided with a frontward-arranged motor that drives, by means of a chain or a belt, the rear wheel 25, or a driving mechanism that is made up of a motor and a transmission box to drive the rear wheel 25. It is noted here that the present invention is not limited to the specific way of driving the rear wheel 25 with the driving motor 3.

As shown in FIGS. 2, 3, and 4, the tread board 274 forms a foot support section 29, and the foot support section 29 functions to receive a rider's feet to place thereon. The tread board 274, the bottom cover 275, and the left tread tube 212 and the right tread tube 213 define a receiving space A. The receiving space A receives and holds therein a battery 4. The battery 4 is electrically connected with the driving motor 3, in order to supply electrical power to the driving motor 3 to drive the rear wheel 25 to rotate, so that a control device (not shown in the drawings) provided on the steering mechanism 221 can be operated to activate the driving motor 3 to drive the rear wheel 25 to rotate so as to thus cause the electric vehicle 2 to move.

As shown in FIGS. 2, 3, and 4, the battery 4 is received and held in a battery box 5. The battery box 5 is received in the receiving space A defined by the left tread tube 212 and the right tread tube 213 in a manner of being arranged in a vehicle body front-rear direction of the electric vehicle 2. The left tread tube 212 is provided with a left shaft support section 2121, and the right tread tube 213 is provided with a right shaft support section 2131. Speaking more precisely, the battery box 5 is provided, on two opposite sides thereof, with support shafts 51 that are extended outward in a vehicle body left-right direction. The support shafts 51 that are provided on the two sides of the battery box 5 are arranged above a battery box center axis of the battery box 5 that is in the vehicle body front-rear direction. As such, the battery box 5 is shaft-supported on the left shaft support section 2121 of the left tread tube 212 and the right shaft support section 2131 of the right tread tube 213 by the support shafts 51 in the vehicle body left-right direction. An opening device 6 is arranged at one side of the battery box 5.

As shown in FIGS. 2, 3, and 4, the opening device 6 comprises a power unit 61 and a driven element 62 that can be driven by the power unit 61. The power unit 61 is fixed to a mounting brace 2132 extended downward from the right tread tube 213. The power unit 61 comprises a power motor section 611 and a transmission section 612. The driven element 62 comprises a toothed member, or more precisely, a curved toothed rack. The driven element 62 is mounted to one side of the battery box 5, which is the right side shown in the drawings as an example for illustration. The driven element 62 is set in engagement with the transmission section 612 of the power unit 61. An electrical power source of the opening device 6 is supplied with a second battery 42 arranged at a lower side of a front portion of the article storage box 28. The steering mechanism 221 is provided with a control button (not shown in the drawings) that controls operation of the opening device 6, so that the control button is used to put the opening device 6 into operation for causing the battery box 5 to rotate, about a rotation center defined by the support shafts 51, in the vehicle body front-rear direction to an open position or a storage position in order to be opened in a condition of generally defining a right angle with respect to a ground surface, thereby allowing a vehicle operator to withdraw and remove the battery 4 from the battery box 5. The opening device 6 can be arranged at the left side or the right side of the battery box 5, and in other words, the opening device 6 can be arranged on the left tread tube 212 or the right tread tube 213. Being arranged on the right tread tube 213 as shown in the instant embodiment is taken as an example for illustration; however, this invention is not limited to such an embodiment.

As shown in FIGS. 2, 4, 5, and 6, the electric vehicle 2 is provided, on the vehicle body at one side of the vehicle body that is opposite to the side stand B, with an electric connection mechanism 7 that allows the battery 4 and a second battery 41 to receive replenishment of electric power. The electric connection mechanism 7 is arranged on the central vehicle body cover 277 at a location that is below and slightly rearward of the front end of the seat section 26 and is located above the foot support section 29. When viewed from the top side, the electric connection mechanism 7 and the side stand B are respectively located at two sides of a vehicle body center axis line 2a of the electric vehicle 2 in the vehicle body front-rear direction, meaning the electric connection mechanism 7 is arranged on one side of the vehicle body opposite to the side of the electric vehicle 2 on which the side stand B is arranged. The electric connection mechanism 7 comprises an electric connection seat 71 and a shielding member 72 set outside and covering the electric connection seat 71. The electric connection seat 71 comprises an opening section 711 and a receptacle 712 arranged in the opening section 711 so as to receive insertion of an external power supply plug P therein to allow the battery 4 and the second battery 41 to receive replenishment of electrical power. The shielding member 72 is rotatably mounted to the frame unit 21 or the central vehicle body cover 277 by means of a pivotal joint section 721 so that the shielding member 72 may selectively cover or not cover the electric connection seat 71. The shielding member 72 may be formed with a part of the central vehicle body cover 277 in one way of embodiment.

As shown in FIGS. 2, 4, 5, and 6, when the electric vehicle 2 is parked with the side stand B, since the electric connection mechanism 7 is arranged on the vehicle body of the electric vehicle 2 at the side thereof that is opposite to the arrangement of the side stand B, when a user attempts to carry out a charging operation for replenishing the battery 4 and the second battery 41 with electric power, the external power supply plug P is inserted through push made in a direction from the electric connection mechanism 7 toward the side stand B so as to have the external power supply plug P inserted into the receptacle 712 of the electric connection seat 71 of the electric connection mechanism 7, and at the same time, the electric vehicle 2 is kept in a stable parking condition by the side stand B that is on the side opposite to the electric connection mechanism 7, so that the user may readily insert the external power supply plug P into the receptacle 712 of the electric connection seat 71 of the electric connection mechanism 7 without undesired concern. Further, the electric connection mechanism 7 is arranged on the central vehicle body cover 277 at a location that is below and slightly rearward of the front end of the seat section 26 and is located above the foot support section 29, so that an optimum distance may be achieved between the electric connection mechanism 7 and the battery 4 and the second battery 41 to effectively reduce a length of an electric wire between the electric connection mechanism 7 and the battery 4 and the second battery 41 to thereby reduce a cost of electrical connection between the electric connection mechanism 7 and the battery 4 and the second battery 41.

Figure 5:
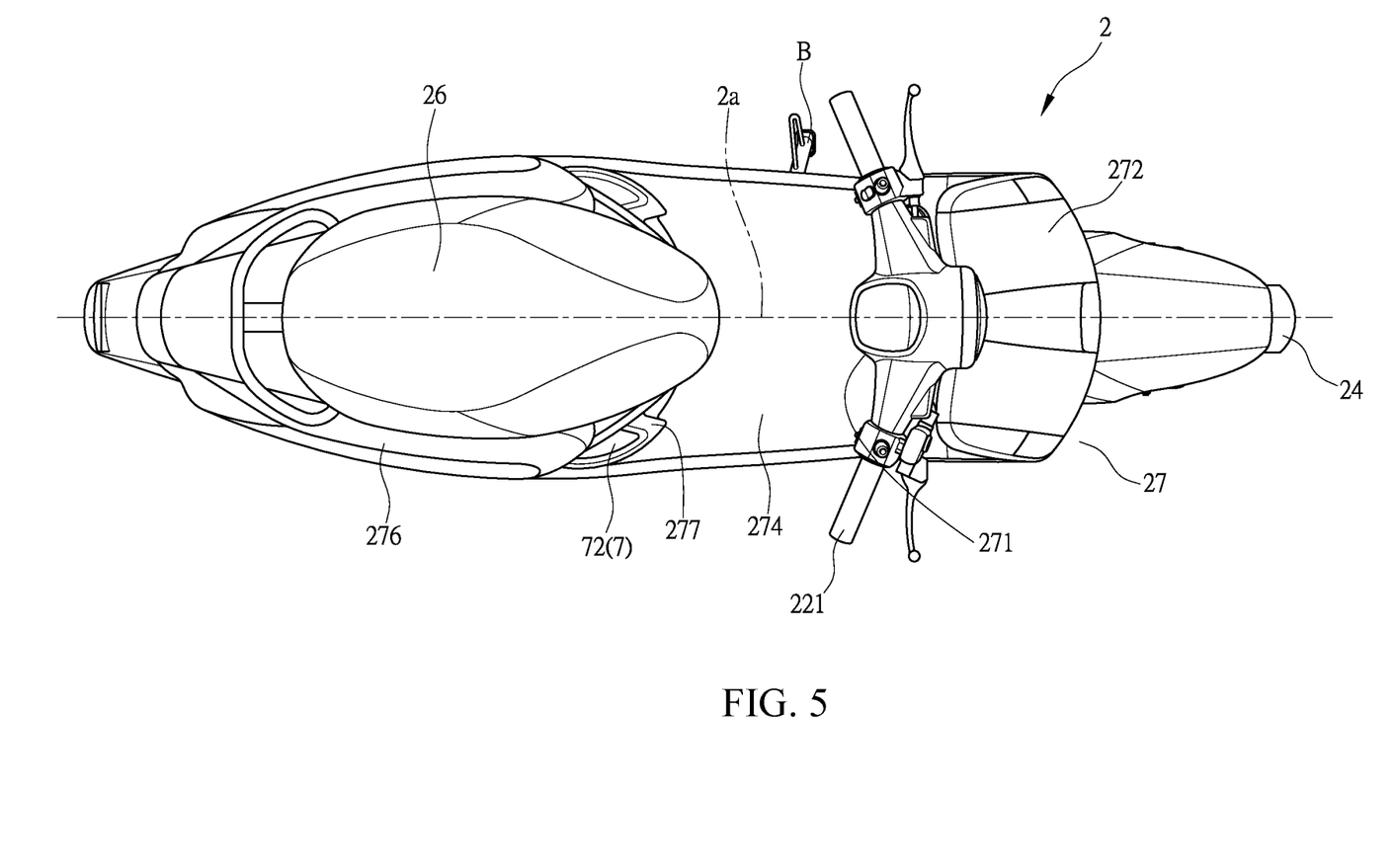
FIG. 5 is a top plan view illustrating the electric vehicle according to the present invention.
Figure 6:
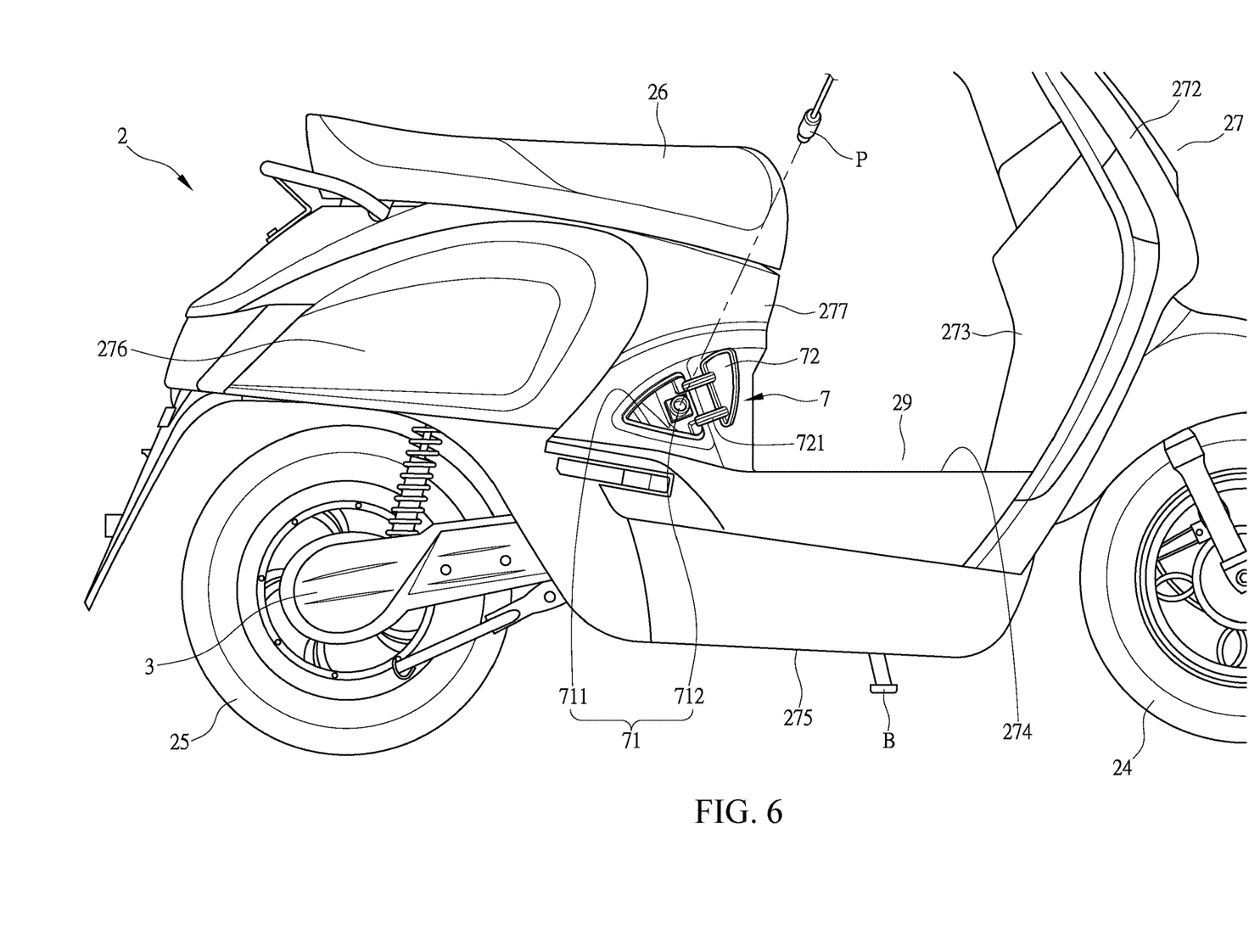
FIG. 6 is a schematic view illustrating an electric connection mechanism according to the present invention.

As shown in FIGS. 5 and 6, the opening section 711 of the electric connection seat 71 is formed in a manner of facing away from the vehicle body center axis line 2a of the electric vehicle 2 and generally horizontal with respect to a ground surface so that when a user inserts the external power supply plug P into the receptacle 712 of the electric connection seat 71 of the electric connection mechanism 7, an effect of secured support of the vehicle body is achieved when the electric vehicle 2 is parked to thereby prevent the electric vehicle 2 from tipping over.

The primary efficacy of the present invention is that an electric connection mechanism 7 that provide replenishment of electrical power to the battery 4 and the second battery 41 is arranged on a vehicle body of the electric vehicle 2 on one side thereof opposite to an arrangement of a side stand B so that a drawback that the electric vehicle 2 tips over when replenishment of electric power is being made to the battery 4 is prevented to thereby improve utilization of the electric vehicle 2.

The second efficacy of the present invention is that a battery box 5 is shaft-supported on a frame unit and is provided, on one side thereof, with a opening device 6, and the opening device 6 comprises a power unit 61 and a driven element 62 drivable by the power unit 61; and the power unit 61 is arranged on a right tread tube 213 and the driven element 62 is arranged on one side of a circumference of the battery box 5 so that installation of the opening device 6 is made easy.

The third efficacy of the present invention is that a frame unit 21 is provided thereon with a seat section 26; a vehicle body cover unit 27 further comprises a central vehicle body cover 277, the central vehicle body cover 277 being located under the seat section 26, a tread board 274 forming a foot support section 29; an electric connection mechanism 7 is arranged on the central vehicle body cover 277 at a location below and slightly rearward of a front end of the seat section 26 and is located above the foot support section 29 so that performance of maintenance and repairing engineering of the electric connection mechanism 7 is made easy.

The fourth efficacy of the present invention is that, when viewed from a top side, the electric connection mechanism 7 and the side stand B are respectively located at two sides of a vehicle body center axis line 2a of an electric vehicle 2 so that a drawback that the electric vehicle 2 tips over when replenishment of electric power is being made to the battery 4 is prevented to thereby improve utilization of the electric vehicle 2.

The fifth efficacy of the present invention is that an electric connection mechanism 7 comprises an electric connection seat 71 and a shielding member 72 set outside and covering the electric connection seat 71 so that a structure of the electric connection mechanism 7 is simplified and the electric connection mechanism 7 is provided with a property of cancellation.

The sixth efficacy of the present invention is that an electric connection seat 71 comprises an opening section 711 and a receptacle 712 arranged in the opening section 711; a shielding member 72 is rotatably mounted to a frame unit 21 or a central vehicle body cover 277 by means of a pivotal joint section 721 so that structures of the electric connection seat 71 and the shielding member 72 of the electric connection mechanism 7 are simplified.

The seventh efficacy of the present invention is that a shielding member 72 is formed with a part of a central vehicle body cover 277 so that a structure of the shielding member 72 of the electric connection mechanism 7 is simplified.

The eighth efficacy of the present invention is that an opening section 711 of the electric connection seat 71 is formed to face away from a vehicle body center axis line 2a of an electric vehicle 2 and generally horizontal with respect to a ground surface so that parking stability of the electric vehicle 2 is improved during an operation of charging with external power supply.

The ninth efficacy of the present invention is that and electric vehicle 2 further comprises a second battery 41, and a frame unit 21 is provided thereon with a seat section 26; an electric connection mechanism 7 is arranged under the seat section 26 and located between a battery 4 and the second battery 41 so that a length of an electric wire between the electric connection mechanism 7 and the battery 4 and the second battery 41 is effectively reduced and a cost of electrical connection between the electric connection mechanism 7 and the battery 4 and the second battery 41 is reduced.

We claim:

1. A structure of an electric vehicle, wherein the electric vehicle at least comprises a frame unit and a vehicle body cover unit; the frame unit comprises tread tubes extending toward a rear side of a vehicle body, the tread tubes being arranged pairwise at left and right sides respectively as a left tread tube and a right tread tube; the vehicle body cover unit at least comprises a tread board that shields the left tread tube and the right tread tube; the frame unit is provided with a battery box that receives and holds therein a battery, and the frame unit is provided thereon with a side stand, wherein the electric vehicle is provided with an electric connection mechanism on the vehicle body at one side thereof opposite to the side stand for replenishing the battery with external electric power, and wherein the electric connection mechanism comprises an electric connection seat and the electrical connection seat comprises an opening section, wherein the opening section of the electrical connection seat is formed in a manner of facing away from a vehicle body center axis line of the electric vehicle and generally horizontal with respect to a ground surface.

2. The structure of the electric vehicle according to claim 1, wherein the battery box is shaft-supported on the frame unit and is provided, on one side thereof, with an opening device, the opening device comprising a power unit and a driven element drivable by the power unit; the power unit is mounted on the tread tubes and the driven element is arranged on one side of an external circumference of the battery box.

3. The structure of the electric vehicle according to claim 1, wherein the frame unit is provided thereon with a seat section; the vehicle body cover unit further comprises a central vehicle body cover, the central vehicle body cover being located under the seat section, the tread board forming a foot support section; the electric connection mechanism is arranged on the central vehicle body cover at a location under and slightly rearward of a front end of the seat section and is located above the foot support section.

4. The structure of the electric vehicle according to claim 1, wherein, when viewed from a top side, the electric connection mechanism and the side stand are respectively located at two sides of the vehicle body center axis line of the electric vehicle.

5. The structure of the electric vehicle according to claim 3, wherein the electric connection mechanism comprises an electric connection seat and a shielding member set outside and covering the electric connection seat.

6. The structure of the electric vehicle according to claim 5, wherein the electric connection seat comprises an opening section and a receptacle arranged in the opening section; the shielding member is rotatably mounted to the frame unit or the central vehicle body cover by a pivotal joint section.

7. The structure of the electric vehicle according to claim 6, wherein the shielding member is formed with a part of the central vehicle body cover.

8. The structure of the electric vehicle according to claim 6, wherein the opening section of the electric connection seat is formed to face away from the vehicle body center axis line of the electric vehicle and generally horizontal with respect to a ground surface.

9. The structure of the electric vehicle according to claim 1, wherein the electric vehicle further comprises a second battery, the frame unit being provided thereon with a seat section; the electric connection mechanism is arranged under the seat section and is located between the battery and the second battery.

10. The structure of the electric vehicle according to claim 4, wherein the electric connection mechanism comprises an electric connection seat and a shielding member set outside and covering the electric connection seat.

11. The structure of the electric vehicle according to claim 10, wherein the electric connection seat comprises an opening section and a receptacle arranged in the opening section;

the shielding member is rotatably mounted to the frame unit or the central vehicle body cover by a pivotal joint section.

12. The structure of the electric vehicle according to claim 11, wherein the shielding member is formed with a part of the central vehicle body cover.

13. The structure of the electric vehicle according to claim 11, wherein the opening section of the electric connection seat is formed to face away from the vehicle body center axis line of the electric vehicle and generally horizontal with respect to a ground surface.

* * * * *